July 19, 1932. G. T. R. HILL 1,868,417
MEANS FOR ADJUSTING WINGS OF AIRCRAFT
Filed Jan. 9, 1931 2 Sheets-Sheet 1
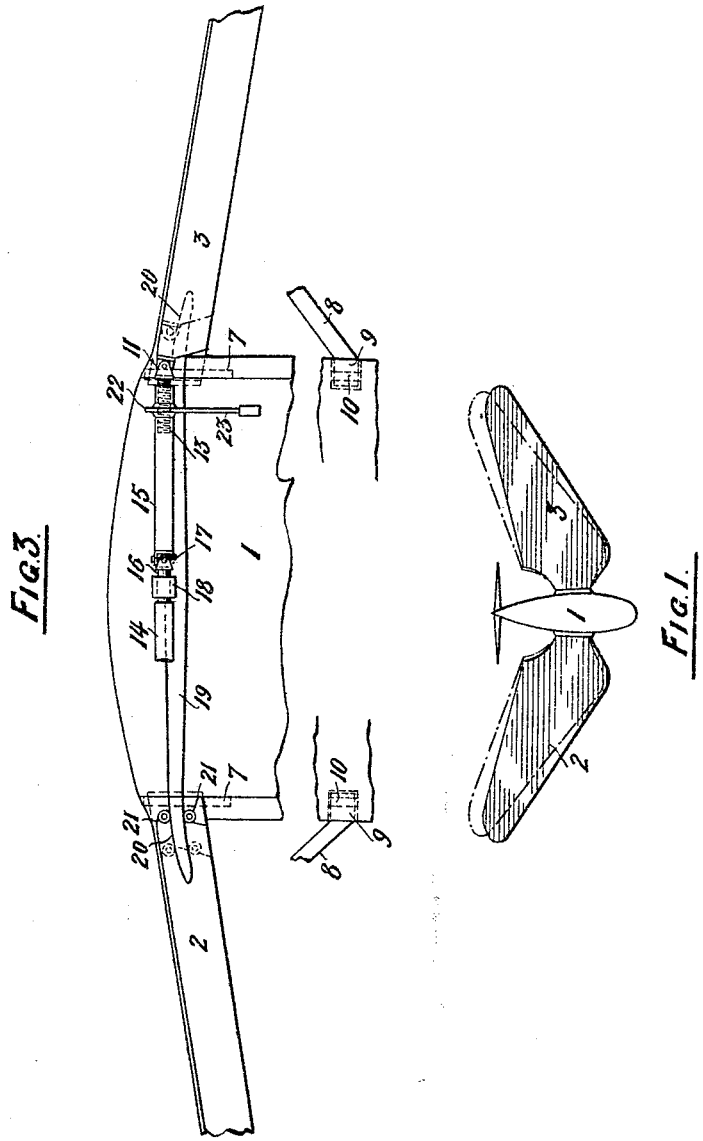

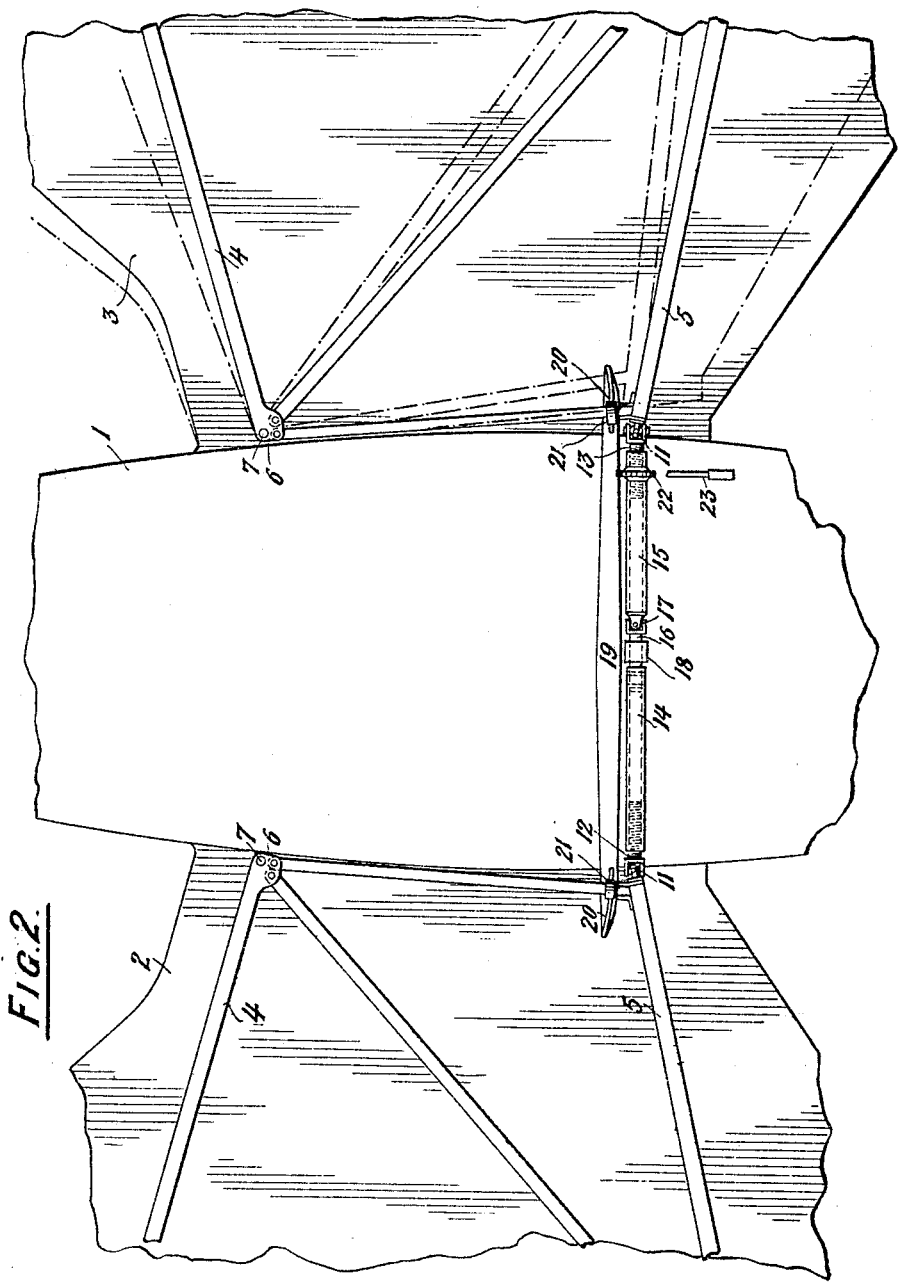

Patented July 19, 1932

1,868,417

UNITED STATES PATENT OFFICE

GEOFFREY TERENCE ROLAND HILL, OF YEOVIL, ENGLAND, ASSIGNOR TO PETTERS LIMITED, OF YEOVIL, SOMERSET, ENGLAND

MEANS FOR ADJUSTING WINGS OF AIRCRAFT

Application filed January 9, 1931, Serial No. 507,735, and in Great Britain January 15, 1930.

This invention relates to means for adjusting wings of aircraft, and particularly for adjusting such wings in a fore and aft direction relatively to the fuselage during flight. The invention is particularly applicable to the Pterodactyl type of aircraft, in which the wings are swept back in arrow form from a central fuselage.

The primary object of this invention is to provide means whereby the centre of pressure of the wings may be adjusted during flight so as to correspond with the centre of gravity of the aircraft in accordance with changes of loading. That is to say, that if additional loads be placed towards the nose of the body the wings will be swept forwards and vice-versa; and as fuel is consumed the adjustment may be effected to preserve perfect balance.

A further object is to secure longitudinal trim for any given position of the centre of gravity, both with the engine giving full power and when throttled down, if the centre of propeller thrust is above or below the centre of gravity.

It will be appreciated that in order to enable the pilot to make the necessary adjustment, and in order to avoid undue stress on the wing structure—(1) the wings should be supported by supporting them on hinges located near one edge of the wings; (2) they should be strongly guided in their angular movement during their adjustment and prevented from moving in a vertical plane with respect to the fuselage; (3) the movement of adjusting should be imparted equally and with great mechanical advantage to both wings simultaneously; and (4) means should be provided whereby the wings may be maintained securely in any desired position of adjustment.

To this end, the means for adjusting the wings of aircraft fore and aft relatively to the fuselage, comprises, in combination, rigidly held pivots located near one edge of the wings, guides for supporting the edges of the wings remote from the pivots during adjustment, and means acting on the wings at points near the edge remote from the pivots and adapted to adjust and to secure the wings in any angular position to which they require to be set in order to adjust the centre of pressure on the wings to agree with the centre of gravity of the aircraft as a whole to accord with the loading and fuel consumption of the aircraft.

The wings, which may be of single monoplane type or may be of multiple surfaces, are hinged at the after spar or after portion on hinged joints sufficiently set apart to support the wings relatively to the fuselage without regard to the angle at which they are swept back or outstand from the fuselage. In this case, the front spar or front portion of each wing is connected to the fuselage by means providing for lateral adjustment, such, for instance, as a tubular right and left thread screw attachment across the fuselage, the rotation of which adjusts the forward portion of the root of each wing outwards or inwards according to the direction of rotation given to the tubular connection. The necessary adjustment may, if desired, be effected by hydraulic or other means.

Alternatively, the hinge may be provided on the front spar or forward position of each wing and the attachment on the rear spar or rearward portion of each wing.

The invention will now be described with reference to the embodiment shown upon the accompanying drawings in which:—

Fig. 1 illustrates diagrammatically, in plan, aircraft of the Pterodactyl type and showing the foremost position of the wings in full lines and showing the rearmost position of the wings in chain-dotted lines, so as to indicate the extent of movement obtained.

Fig. 2 is a fragmentary plan view of the fuselage and roots of the wings drawn to an enlarged scale.

Fig. 3 is a front elevation, having part of the attachment means broken away at one end in order to show the guides for the wings.

In the drawings, 1 indicates the fuselage and 2 and 3 the wings. Each wing is provided with a rear spar 4 and a front spar 5. The rear spar is formed with a fitment 6 for a hinge pin 7. In order that a hinge of sufficient axial depth to secure satisfactory support for the wings may be provided, a wing strut 8 is provided with a fitment 9 for a hinge pin 10. With this arrangement the over-all depth of the hinge pins 7 and 10 constitutes the axial depth of the hinge.

On the forward spar 5 of each wing, attachment means by which the forward edges of the root of the wings are attached together and to the fuselage is provided. This attachment means comprises universal joints 11 between the root ends on said spar 5 and screw shanks 12 and 13. The screw shanks 12 and 13 are of opposite hand, one having a right hand thread and the other a left hand thread. The screw shank 12 screws into the tubular member 14, while the screw shank 13 screws into the tubular member 15. The tubular members 14 and 15 are connected together by a central spindle 16 and a universal joint 17. Spindle 16 is rotatably mounted in a bearing 18 on a guide member 19 fixed on the fuselage. This guide member 19 extends laterally beyond the sides of the fuselage and is provided with guide surfaces 20 struck with an arc from the hinge pin 7 against which guide surfaces, rollers 21 on the wing bear. As shown in Figure 3, the outer end of the guide rail is faired away in order to guide the wing accurately into position when returning the wings from a folded back position into which they have been moved so as to occupy less storage space on the ground. The rotation of the tubes 14 and 15 will effect an outward and inward adjustment of the fore portions of the wing roots according to whether the tubes are turned to the right, i. e. clockwise or to the left i. e. anti-clockwise. As means for turning the tubes, a ratchet wheel 22 is fixed on the tube 15, this ratchet wheel being capable of operation in either direction by a handle 23 which can be actuated by the pilot during flight.

What I claim as my invention and desire to secure by Letters Patent is:—

1. In aircraft having a fuselage, and wings, means adjustable at will during flight to shift the wings to bring the center of pressure thereon into correspondence with changes in the position of the center of gravity of the aircraft as a whole, comprising in combination rigid hinges interconnecting the fuselage and the wings, located on opposite sides of the fuselage near one edge of each wing and extending substantially perpendicularly to the line of flight of the aircraft, at least one guide member mounted on the fuselage and adapted to prevent twisting movement with respect to the fuselage of the edges of the wings remote from the hinges, and an adjusting device anchored to the fuselage and operating on the wings at points adjacent to the guide member aforesaid, for effecting positive fore and aft adjustment of the wings about the hinges to equal extents and in the same fore and aft direction for each wing, said adjusting device being arranged to maintain the wings in any desired position of adjustment and positively to restrain unequal movement of the wings about their hinges.

2. In aircraft having a fuselage and wings, means adjustable at will during flight to shift the wings to bring the center of pressure thereon into correspondence with changes in the position of the center of gravity of the aircraft as a whole, comprising in combination rigid hinges interconnecting the fuselage and the wings, located on opposite sides of the fuselage adjacent to one edge of each wing and extending substantially perpendicularly to the line of flight of the aircraft, a guide member mounted on the fuselage, extending transversely of the fuselage for preventing vertical movement with respect to the fuselage of the edges of the wings remote from the hinges, and an adjusting device anchored to the fuselage and extending in a direction substantially parallel to and operating on the wings at points adjacent to the guide member aforesaid, for effecting positive fore and aft adjustment of the wings about the hinges to equal extents and in the same fore and aft direction for each wing, said adjusting device being arranged to maintain the wings in any desired position of adjustment and positively to restrain unequal movement of the wings about their hinges.

3. In aircraft having a fuselage and wings, means adjustable at will during flight to shift the wings to bring the center of pressure thereon into correspondence with changes in the position of the center of gravity of the aircraft as a whole, comprising in combination rigid hinges, interconnecting the fuselage and the wings located on opposite sides of the fuselage adjacent to one edge of each wing and extending substantially perpendicularly to the line of flight of the aircraft, an adjusting device comprising right and left hand threaded connections arranged transversely of the fuselage and operating on the wings at points near the edges remote from the hinges aforesaid for effecting positive fore and aft adjustment of the wings about the hinges to equal extents and in the same fore and aft direction for each wing, actuating members for said threaded connections anchored to the fuselage and adapted to maintain the wings in any desired position of adjustment, and a guide member mounted on and extending transversely of the fuselage adjacent to the adjusting device for preventing vertical movement with respect to the fuselage of the edges of the wings remote from the hinges.

4. In aircraft having a fuselage and wings comprising two spars, one near the front edge, and one near the rear edge of the wings, means adjustable at will during flight to shift the wings to bring the center of pressure thereon into correspondence with changes in the center of gravity of the aircraft as a whole comprising in combination rigid hinges, extending in a direction substantially perpendicular to the line of flight and located on opposite sides of the fuselage and adapted to interconnect the fuselage with corresponding spars on each wing, an adjusting device comprising right and left hand threaded connections arranged transversely of the fuselage and operating on the spars remote from the hinges for effecting positive fore and aft adjustment of the wings about the hinges to equal extents and in the same fore and aft direction for each wing, actuating members for said threaded connections anchored to the fuselage and adapted to maintain the wings in any desired position of adjustment, and a guide member mounted on and extending transversely of the fuselage adjacent to the adjusting device for preventing vertical movement with respect to the fuselage of the edges of the wings remote from the hinges.

5. In aircraft having a fuselage and wings, means adjustable at will during flight to shift the wings to bring the center of pressure thereon into correspondence with changes in the position of the center of gravity of the aircraft as a whole, comprising in combination rigid hinges, interconnecting the fuselage and the wings, located on opposite sides of the fuselage adjacent to one edge of each wing and extending substantially perpendicularly to the line of flight of the aircraft, an adjusting device comprising right and left hand threaded connections arranged transversely of the fuselage and operating on the wings at points near the edges remote from the hinges aforesaid, for effecting positive fore and aft adjustment of the wings about the hinges to equal extents and in the same fore and aft direction for each wing, actuating members for said threaded connections anchored to the fuselage and adapted to maintain the wings in any desired position of adjustment, a guide member mounted on the fuselage and extending adjacent to and parallel to the adjusting device comprising arcuate bearing surfaces struck with an arc from the hinges for preventing vertical movement with respect to the fuselage of the edges of the wings remote from the hinges, and rollers attached to the wings, and adapted to rest on said bearing surfaces.

6. In aircraft having a fuselage and wings comprising two spars, one near the front edge, and one near the rear edge of the wings, means adjustable at will during flight to shift the wings to bring the center of pressure thereon into correspondence with changes in the center of gravity of the aircraft as a whole, comprising in combination rigid hinges extending in a direction substantially perpendicular to the line of flight and located on opposite sides of the fuselage and adapted to interconnect the fuselage with corresponding spars on each wing, an adjusting device comprising right and left hand threaded connections arranged transversely of the fuselage and operating on the spars remote from the hinges, and a guide member mounted on the fuselage and extending adjacent to and parallel to the adjusting device and comprising arcuate bearing surfaces struck with an arc from the hinges for preventing vertical movement with respect to the fuselage of the edges of the wings remote from the hinges, and rollers attached to the wings, and adapted to rest on said bearing surfaces.

7. In aircraft having a fuselage and wings, means adjustable at will during flight to shift the wings to bring the center of pressure thereon into correspondence with changes in the position of the center of gravity of the aircraft as a whole, comprising in combination rigid hinges interconnecting the fuselage and the wings located on opposite sides of the fuselage adjacent to one edge of each wing and extending substantially perpendicularly to the line of flight of the aircraft, an adjusting device comprising right and left hand threaded connections arranged transversely of the fuselage and operating on the wings through universal joints at points near the edges remote from the hinges aforesaid, for effecting positive fore and aft adjustment of the wings about the hinges to equal extends and in the same fore and aft direction for each wing, actuating members for said threaded connections comprising internally threaded tubular members, one for each threaded connection, anchored to the fuselage, and united to one another by a universal joint and adapted to lock the threaded connections and maintain the wings in any desired position of adjustment, a guide member mounted on the fuselage and extending adjacent to and parallel to the adjusting device comprising arcuate bearing surfaces struck with an arc from the hinges for preventing vertical movement with respect to the fuselage of the edges of the wings remote from the hinges and rollers attached to the wings, and adapted to rest on said bearing surfaces.

8. In aircraft having a fuselage and wings comprising two spars, one near the front edge, and one near the rear edge of the wings, means adjustable at will during flight to shift the wings to bring the center of pressure thereon into correspondence with changes in the center of gravity of the aircraft as a whole, comprising in combination rigid hinges extending in a direction substantially perpendicular to the line of flight and located on opposite sides of the fuselage and adapted to interconnect the fuselage with corresponding spars on each wing, an adjusting device comprising right and left hand threaded connections arranged transversely of the fuselage and operating on the spars remote from the hinges, and a guide member mounted on the fuselage extending adjacent to and parallel to the adjusting device and comprising arcuate bearing surfaces struck with an arc from the hinges for preventing vertical movement with respect to the fuselage of the edges of the wings remote from the hinges, said bearing surfaces being faired away at their outer ends, and rollers attached to the wings, and adapted to rest on said bearing surfaces.

9. In aircraft having a fuselage and wings comprising two spars, one near the front edge, and one near the rear edge of the wings, means adjustable at will during flight to shift the wings to bring the center of pressure thereon into correspondence with changes in the center of gravity of the aircraft as a whole, comprising in combination rigid hinges extending in a direction substantially perpendicular to the line of flight and located on opposite sides of the fuselage and adapted to interconnect the fuselage with corresponding spars on each wing, an adjusting device comprising right and left hand threaded connections arranged transversely of the fuselage and operating on the wings through universal joints at points near the edges remote from the hinges aforesaid, for effecting positive fore and aft adjustment of the wings about the hinges to equal extents and in the same fore and aft direction for each wing, actuating members for said threaded connections comprising internally threaded tubular members, one for each threaded connection, anchored to the fuselage, and united to one another by a universal joint and adapted to lock the threaded connections and maintain the wings in any desired position of adjustment, a guide member mounted on the fuselage and extending adjacent to and parallel to the adjusting device comprising arcuate bearing surfaces struck with an arc from the hinges for preventing vertical movement with respect to the fuselage of the edges of the wings remote from the hinges and rollers attached to the wings, and adapted to rest on said bearing surfaces.

10. In aircraft having a fuselage and wings comprising two spars, one near the front edge, and one near the rear edge of the wings, means adjustable at will during flight to shift the wings to bring the center of pressure thereon into correspondence with changes in the center of gravity of the aircraft as a whole, comprising in combination rigid hinges extending in a direction substantially perpendicular to the line of flight and located on opposite sides of the fuselage and adapted to interconnect the fuselage with corresponding spars on each wing, an adjusting device comprising right and left hand threaded connections arranged transversely of the fuselage and operating on the wings through universal joints at points near the edges remote from the hinges aforesaid, for effecting positive fore and aft adjustment of the wings about the hinges to equal extents and in the same fore and aft directions for each wing, actuating members for said threaded connections comprising internally threaded tubular members, one for each threaded connection, anchored to the fuselage, and united to one another by a universal joint and adapted to lock the threaded connections and maintain the wings in any desired position of adjustment, a guide member mounted on the fuselage and extending adjacent to and parallel to the adjusting device and comprising arcuate bearing surfaces struck with an arc from the hinges for preventing vertical movement with respect to the fuselage of the edges of the wings remote from the hinges, said bearing surfaces being faired away at their outer ends, and rollers attached to the wings, and adapted to rest on said bearing surfaces.

11. In aircraft having a fuselage and wings, means adjustable at will during flight to shift the wings to bring the center of pressure thereon into correspondence with changes in the position of the center of gravity of the aircraft as a whole, comprising in combination rigid hinges interconnecting the fuselage and the wings located on opposite sides of the fuselage adjacent to one edge of each wing and extending substantially perpendicularly to the line of flight of the aircraft, a guide member mounted on the fuselage and extending transversely of the fuselage for preventing vertical movement with respect to the fuselage of the edges of the wings remote from the hinges, an adjusting device comprising right and left hand threaded connections arranged transversely of the fuselage and operating on the wings at points near the edges remote from the hinges aforesaid, for effecting positive fore and aft adjustment of the wings about the hinges to equal extents and in the same fore and aft direction for each wing, a bearing mounted on said guide member, and internally threaded tubular members carried by said bearing and adapted to cooperate with the aforesaid right and left threaded connections to effect adjustment of the wings and to maintain them in any desired position of adjustment.

12. In aircraft having a fuselage and wings, means adjustable at will during flight to shift the wings to bring the center of pressure thereon into correspondence with changes in the position of the center of gravity of the aircraft as a whole, comprising in combination rigid hinges interconnecting the fuselage and the wings located on opposite sides of the fuselage adjacent to one edge of each wing and extending substantially perpendicularly to the line of flight of the aircraft, a guide member mounted on the fuselage and extending transversely of the fuselage for preventing vertical movement with respect to the fuselage of the edges of the wings remote from the hinges, an adjusting device comprising right and left hand threaded connections arranged transversely of the fuselage and operating on the wings at points near the edges remote from the hinges aforesaid, for effecting positive fore and aft adjustment of the wings about the hinges to equal extents and in the same fore and aft direction for each wing, a bearing mounted on said guide member and internally threaded tubular members carried by said bearing and adapted to co-operate with the aforesaid right and left threaded connections to effect adjustment of the wings and to maintain them in any desired position of adjustment, a ratchet wheel associated with one of said tubular members, and an operating handle adapted to engage with said ratchet handle for the purpose of effecting the adjustment of the wings.

13. In aircraft having a fuselage and wings, comprising two spars one adjacent the front edge and one adjacent the rear edge of each wing, means adjustable at will during flight to shift the wings to bring the center of pressure thereon into correspondence with changes in the position of the center of gravity of the aircraft as a whole, comprising in combination rigid hinges extending substantially perpendicularly to the line of flight of the aircraft and located on opposite sides of the fuselage and adapted to interconnect the fuselage with corresponding spars on each wing, an adjusting device comprising right and left hand threaded connections arranged transversely of the fuselages and operating through universal joints on the spars remote from the hinges for effecting positive fore and aft adjustment of the wings about the hinges to equal extents and in the same fore and aft direction for each wing, a guide member, mounted on the fuselage and extending adjacent to and parallel to the adjusting device and comprising arcuate bearing surfaces struck with an arc from the hinges, for preventing vertical movement with respect to the fuselage of the edges of the wings remote from the hinges, said bearing surfaces being faired away at their outer ends, rollers attached to the wings, and adapted to rest on said bearing surfaces, a bearing mounted on said guide member, internally threaded tubular members one adapted to co-operate with each of the aforesaid right and left threaded connections in the adjustment of the wings and to maintain them in any desired position of adjustment, said tubular members being carried by said bearing and secured to one another by a universal joint, a ratchet wheel associated with one of said tubular members, and an operating handle adapted to engage with said ratchet wheel for the purpose of effecting adjustment of the wings.

In witness whereof I have hereunto set my hand.

GEOFFREY TERENCE ROLAND HILL.